Patented Jan. 21, 1947

UNITED STATES PATENT OFFICE 2,414,497

PLASTICIZATION OF POLYMERIZED STYRENE

Arthur James Warner and Archibald Alan New, London W. C. 2, England, assignors to International Standard Electric Corporation, New York, N. Y.

No Drawing. Original application February 11, 1938, Serial No. 190,032. Divided and this application July 26, 1941, Serial No. 404,198. In Great Britain February 19, 1937

4 Claims. (Cl. 260—36)

The present application is a division of application Serial No. 190,032, filed February 11, 1938.

The different synthetic resins formed by the polymerization of styrene possess physical properties, particularly as regards fusibility and flexibility which vary throughout a wide range. The polymers formed at high temperatures are readily fusible, but are very brittle when cold, whereas polymers formed at room temperature are infusible and relatively tough. All types of polymers of styrene have excellent insulating properties, particularly at very high frequencies of the order of $10^6$ cycles and higher. It is, however, necessary for many electrical purposes that the material be made appreciably more flexible and less brittle, e. g., in the production of threads and strands for insulating purposes in coaxial cable and films for lapping and general insulation purposes.

Many proposals have previously been made for the use of many different materials as plasticizers of polymerized styrene. In many cases these materials have been stated to plasticize any of a wide range of plastics such as cellulose esters and ethers, and polymerized vinyl resins generally. Due to the varied chemical composition of the plastics and plasticizers, it has been found that in many cases no plasticizing effect takes place, e. g., a plasticizer for one compound is not necessarily a plasticizer for another.

It has also been found that in some cases there is an appreciable loss of these plasticizers in a comparatively short time with a corresponding falling off in the plasticizing effect. The boiling point of a compound may be taken as giving for practical purposes a rough criterion as to the vapour pressure.

According to the present invention a method of plasticizing polymerized styrene consists in adding thereto a chemically stable homocyclic carbon compound having two or three fused rings that has a boiling point higher than 240° C. that possesses a low electric moment, and is capable of swelling polystyrene. By a stable compound is meant a compound that does not readily alter its chemical composition on exposure to air. By a compound that possesses a low electric moment is meant a compound that either does not have any polar groups, or has polar groups arranged symmetrically or has a single chloro, carboxylic ester, or carboxylic group containing not more than 5 carbon atoms. By a compound capable of swelling polystyrene is meant an aromatic compound not possessing hydroxide or keto groups and also either without side chains or having only side chains containing not more than 5 carbon atoms.

The electric moment of the compound is sufficiently low in accordance with the invention if the addition of sufficient of the compound to polystyrene to increase its plasticity five fold does not increase the power factor at $10^6$ cycles a second more than five times. (The power factor of polystyrene itself is 0.002 at $10^6$ cycles per second).

The plasticizer may be incorporated with the polystyrene, either by adding to the monomer before polymerization, by hot rolling with the polymerized styrene, or by dissolving along with the polymerized styrene in a mutual solvent and subsequently evaporating the solvent.

The following comparative figures of the action of various substances upon polymerized styrene have been obtained by dissolving 30 grams of the polymerized styrene sold under the trade name of "Trolitul" in 100 cc. of benzene, shaking for 24 hours and filtering. Such a solution has a viscosity of 330 centistokes at 20° C. To 50 grams of the filtrate there was added sufficient of the substance to be tested to give the desired percentage, 50 cc. of benzene was added and the whole mixture shaken to effect solution. 3 cc. of this solution was run over the surface of clear mercury in a crystallizing dish, the resulting film allowed to remain on the mercury for 48 hours and then removed and stored for a further 5 days before testing in order to ensure that the last traces of solvent had been removed. The films tested were from 1 to 1½ mils in thickness.

Strips 9 cms. long and 5 mms. in breadth cut from the films were tested by being passed between two brass rods each 0.25" in diameter and 0.005" apart mounted on a plate, the film being clamped by jaws 0.5" below the rods, and maintained under a tension of 200 grams. The jaws were then moved to and fro through an angle of 280° so as to bend the strip round the brass rods at each reciprocation. The number of bends before the strip breaks is a measure of the plasticity of the material of the strip. The number of bends for polystyrene itself without the addition of other substances was 8.

As a guide to the percentages of plasticizer that may be used, the following examples are given:

Example I

Phenanthrene added in different percentages to polystyrene gave the number of bends shown below:

| Per cent phenanthrene | No. of bends |
|---|---|
| 0 | 8 |
| 5 | 42 |
| 10 | 79 |
| 15 | 89 |
| 20 | 95 |

Films containing 20% of phenanthrene show signs of crystals indicating that the limit of solubility had been reached.

Example II

α Isoamyl naphthalene added in different percentages up to 20% increased the plasticity of polystyrene, but the power factor with an addition of 15% was 0.0008 at $10^6$ cycles per second and, therefore, was approaching the allowable limit.

Example III

α-n-Propylnaphthalene increases the plasticity of polystyrene in percentages up to 15% but higher percentages do not cause any further increase in plasticity. The power factor of the mixture containing 15% is 0.0008.

Example IV

β Methylnaphthalene increases the plasticity when added in amounts at least up to 25%. For amounts greater than 10% however, the power factor exceeds 0.001.

The plasticiers according to the invention may be usefully contrasted with certain substances excluded from the invention.

Polychlorinated diphenyls sold under the trade names "Aroclor" and "Permitol" have been used as plasticizers, but they are unsymmetrical compounds and increase the power factor of polystyrene unduly. Thus 6% of these substances gave a test result of 40 bends but the power factor is raised to 0.0015 at $10^6$ cycles per second.

Dibutyl phthalate has frequently been suggested as a plasticizer, but it possesses a high electric moment. 2.7% is sufficient to give a test result of 40 bends but the power factor is 0.0015 at $10^6$ cycles per second.

10% of 9-bromophenanthrene gives a test result of 33 bends only and the power factor is raised to 0.0033 at $10^6$ cycles per second.

10% of methyl-β-naphthyl ketone gave a test result of 63 bends but raised the power factor to 0.0126 at $10^6$ cycles per second.

Bezene, toluene, and xylene have been suggested for use as plasticizers, but owing to their low boiling point, the plasticity is rapidly lost with time. The same thing is true of di-phenyl and naphthalene (which are also excellent plasticizers) as shown by the following results:

| Plasticizers | Quantity | Age of film | No. of bends before fracture |
|---|---|---|---|
| | Per cent | Weeks | |
| Diphenyl | 10 | 1 | 64 |
| | | 2 | 63 |
| | | 6 | 56 |
| | 20 | 1 | 86 |
| | | 2 | 56 |
| Naphthalene | 15 | 1 | 49 |
| | | 4 | 45 |
| | | 8 | 41 |

Methyl abietate has also been claimed and while it is useful for temporary purposes it is not of permanent value due to its oxidizing to a brittle resin by taking up atmospheric oxygen and thus losing its plasticizing power.

On the other hand the effect of time with certain plasticizers according to the invention is shown in the following:

| Plasticizer | Quantity | Age of film | No. of bends before fracture |
|---|---|---|---|
| | Per cent | Weeks | |
| Phenanthrene | 5 | 1 | 42 |
| | | 4 | 41 |
| | 15 | 1 | 89 |
| | | 4 | 88 |
| | | 8 | 88 |
| | | 12 | 88 |
| Isoamylnaphthalene | 5 | 1 | 65 |
| | | 6 | 65 |
| | 15 | 1 | 132 |
| | | 8 | 126 |

The following table shows the properties of certain substances that may be used in accordance with the invention as plasticizers:

| Plasticizer | Per cent required to give test result of 40 bends before fracture | Power factor at $10^6$ cycles | Boiling point |
|---|---|---|---|
| | | | °C. |
| Phenanthrene | 4.8 | 0.0004 | 340 |
| α-Isoamylnaphthalene | 2.0 | .0003 | 290 |
| α-n-Propylnaphthalene | 4.8 | .0004 | 294 |
| β-Methylnaphthalene | 5.0 | .0003 | 245 |
| Fluorene | 5.0 | .0007 | 305 |
| Mixture of octahydroanthracene and octahydrophenanthrene | 6.0 | .0003 | Over 300 |

Polymerized styrene plasticized by the addition of any of the compounds according to the invention is particularly well adapted for the construction of dielectric wave guides, for use as insulation in coaxial cables, and for use as a dielectric of condensers particularly those intended for circuits in which very high frequency currents flow.

What is claimed is:

1. An improved electrical high frequency insulation of plasticized polymerized styrene admixed with a hydrocarbon substitution compound of naphthalene having not more than 5 carbon atoms in the chain, and characterized by a power factor of less than .001 at $10^6$ cycles.

2. An improved electrical high frequency insulation of plasticized polymerized styrene admixed with an amyl naphthalene, and characterized by a power factor of less than .001 at $10^6$ cycles.

3. An improved electrical high frequency insulation of plasticized polymerized styrene admixed with between 1% and 20% of an amyl naphthalene, and characterized by a power factor of less than .001 at $10^6$ cycles.

4. An improved electrical high frequency insulation of plasticized polymerized styrene admixed with between 1% and 20% of alpha-isoamylnaphthalene, and characterized by a power factor of less than .001 at $10^6$ cycles.

ARTHUR JAMES WARNER.
ARCHIBALD ALAN NEW.